United States Patent [19]

Sitton et al.

[11] Patent Number: 4,515,347
[45] Date of Patent: May 7, 1985

[54] VALVE SEAT STRUCTURE

[75] Inventors: Willard J. Sitton; William L. Whaley, both of Houston, Tex.

[73] Assignee: Joy Manufacturing Company, Pittsburgh, Pa.

[21] Appl. No.: 453,845

[22] Filed: Dec. 27, 1982

[51] Int. Cl.$^3$ .................................................. F16K 3/02
[52] U.S. Cl. .................................... 251/328; 251/363; 251/368
[58] Field of Search ............... 251/328, 363, 317, 172, 251/368

[56] References Cited

U.S. PATENT DOCUMENTS

| | | | |
|---|---|---|---|
| 2,985,421 | 5/1961 | Anderson et al. | 251/363 X |
| 2,985,422 | 5/1961 | Anderson et al. | 251/363 X |
| 3,215,157 | 11/1965 | Anderson et al. | 251/328 X |
| 3,589,674 | 6/1971 | Jones | 251/363 X |
| 3,983,894 | 10/1976 | Sheppard . | |
| 4,111,395 | 9/1978 | Sheppard . | |

*Primary Examiner*—Arnold Rosenthal
*Attorney, Agent, or Firm*—Marvin J. Marnock

[57] ABSTRACT

A valve seat structure adapted to be positioned within each annular seat pocket (37, 36) which is formed about the flow passage (12, 13) adjacent the valve chamber on both the upstream and downstream sides of the gate element of a gate valve. The valve seat structure comprises a metallic seat ring (40) which fits snugly within the seat pocket (36, 37) but has an axial dimension which exceeds the depth of the pocket. The seat ring is formed with an annular notch (49, 50) in the outer corner of the ring at its rear face (48) for accommodating a resilient O-ring (66) therein. In its front face (47) the seat ring is provided with an annular groove (51) coaxial with the ring axis and provided with serrated side walls (51a, 51b). A plurality of passages (55) are formed in the ring with equiangular spacing and extend from the face groove (51) to the corner notch (49, 50). The passages (55) are filled with an elastomer (60) which is molded therein to fill the passages and the groove in the front face of the seat ring and is also bonded to the seat ring by an elastomer adhesive. The inner diameter of the face groove is less than the inner diameter of the corner notch such that the upstream seat structure tends to be pressure energized towards the gate of the valve to enhance its sealing effectiveness. The elastomer insert (60) is formed with a rounded face (65) which projects beyond the front face (47) of the seat ring. The annular opening of the groove in the face of the seat ring is formed with bevelled edges (53a, 53b) to provide a widened mouth of the groove which accommodates the deformed and compressed face of the elastomer sealing element when the gate element (16) is disposed in sealing engagement therewith. The accommodation of the elastomer material when compressed against the gate element enhances its resistance to wear and abrasion to extend the life of the valve and the passages (55) filled with elastomer (60) increase the resistance of the elastomer sealing element to being pressure extruded from the seat ring and enhances its sealing capabilities by being pressure energized towards the cooperating sealing surfaces of the valve.

4 Claims, 5 Drawing Figures

VALVE SEAT STRUCTURE

BACKGROUND OF THE INVENTION

This invention relates generally to gate valves and more particularly to an improved valve seat structure for gate valves of the type having a slab gate member and cooperating seat members which form a seal both upstream and downstream.

Slab gate valves typically employ a slab gate element which is provided with parallel planar sealing faces for sealing against annular seat members disposed on both the upstream and downstream sides of the gate in surrounding relation to the flow passage through the valve. For facilitating the establishment of a fluid-tight seal between the gate and seat member, it has been common practice to provide the sealing face of the seat member with an annular ring insert of resilient or plastic deformable material such as Teflon. Unfortunately, fluoroelastomers such as Teflon have very little abrasion resistance and accordingly, the sealing capability of the fluoroelastomer sealing insert deteriorates after repeated use. The diminution of sealing ability is also noted with most other resilient sealing inserts due to the effects of erosion. If the valve is operating in sandy slurry media or other similar abrasive or corrosive ladings, the problem tends to become a critical one in a very short time.

Another problem which tends to occur in very high pressure applications is the frequent loss of the annular sealing element by its being pressure extruded from the face of the seat ring.

It is therefore a primary object of this invention to provide a valve seat assembly for a gate valve which comprises a seat ring having a sealing insert in the front face thereof which has enhanced resistance to abrasion.

It is another object to provide a valve seat assembly for a gate valve which comprises a valve seat ring which can be used as either an upstream or downstream seat and comprises a valve seat ring with an annular sealing element in the face thereof which is resistant to being pressure extruded from the seat ring.

A further object is to provide an improved valve seat assembly for a gate valve which comprises a seat ring with an annular sealing element in the front face thereof which tends to be fluid pressure energized for enhancing the sealing capabilities of the valve seat.

SUMMARY OF THE INVENTION

The invention is an improved valve seat structure for use in a gate valve. The valve seat structure is adapted to be positioned within each annular seat pocket which is formed about the flow passage adjacent the valve chamber on both the upstream and downstream sides of the gate element of the valve. The valve seat structure comprises a metallic seat ring which is adapted to fit snugly within the seat pocket but has an axial dimension which exceeds the depth of the seat pocket. The seat ring is formed with an annular notch in the outer corner of the ring at its rear face for accommodating a resilient O-ring therein. In its front face the seat ring is provided with an annular groove in coaxial relation with the ring axis and provided with serrated side walls. A plurality of passages are also formed in the ring with equiangular spacing which extends from the bottom of the face groove to the corner notch at the rear of the seat ring. The passages are filled with an elastomer material which is molded therein to fill the passages and the groove in the front face of the seat ring and is also bonded to its metal contact surfaces of the seat ring by an elastomer adhesive. The inner diameter of the face groove is less than the inner diameter of the corner notch at the rear of the seat ring such that the upstream seat ring structure tends to be pressure energized towards the gate of the valve to enhance its sealing effectiveness. The elastomer insert is formed with a rounded face which projects beyond the front face of the seat ring. The annular opening of the groove in the face of the seat ring is formed with annular edges to provide a widened mouth of the groove which accommodates the deformed and compressed face of the elastomer sealing element when the gate element is disposed in sealing engagement therewith. This accommodation of the elastomer sealing material when compressed against the gate element greatly enhances its resistance to wear and abrasion to extend the life of the valve. The plurality of passages filled with elastomer increases the resistance of the elastomer sealing element to being pressure extruded from the seat ring and enhances its sealing capabilities by being pressure energized towards the cooperating sealing surfaces of the valve.

BRIEF DESCRIPTION OF THE DRAWINGS

In the accompanying drawings which form part of the specification and are to be read in conjunction therewith.

DESCRIPTION OF A PREFERRED EMBODIMENT

Figure 1:
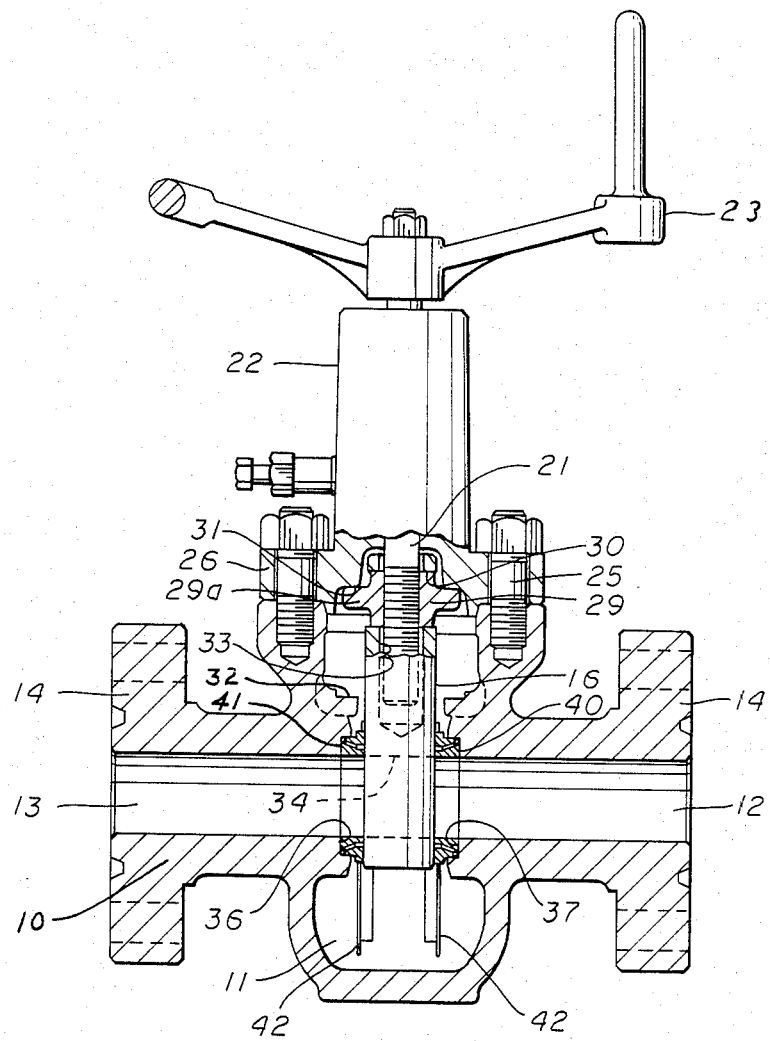
FIG. 1 is a longitudinal view, partly in section, of a gate valve which embodies the valve seat assembly of this invention.
Figure 2:
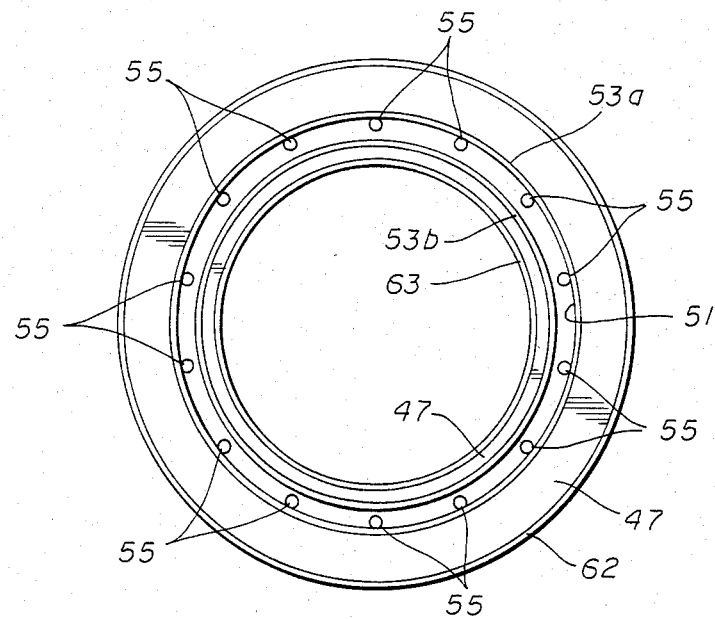
FIG. 2 is a planar view of the front face of the seat ring of the invention.
Figure 3:
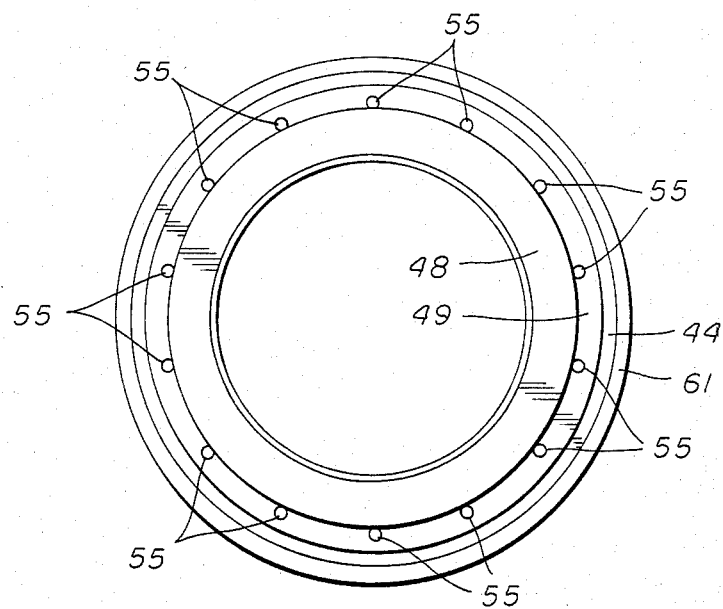
FIG. 3 is a planar view of the rear face of the seat ring of FIG. 2.

Referring to the drawings in greater detail, and to FIG. 1 in particular, the invention is herein illustrated in connection with a gate valve of the type having a non-rising valve stem and a slab gate member for opening and closing of the valve. The valve shown in FIG. 1 includes a valve body 10 provided with a valve chamber 11 and inlet and outlet flow passages 12 and 13, respectively. The flow passages 12 and 13 are in fluid communication with the valve chamber 11 to form a flow way through the valve when the valve is open. Flanges 14 formed at the ends of the valve body 10 provide means for connecting the valve in a flowline in conventional manner.

Within the chamber 11, a gate member 16 is mounted for sliding reciprocating movement transversely of the flow passages 12, 13 to open or close the valve. The gate member 16 is connected at its upper end to a valve stem 21 which extends through the bonnet 22 and is equipped at its upper end with a valve actuating member such as a handwheel 23. The bonnet 22 is mounted atop the valve body 10 and bolted thereto by a plurality of bolts 25 which pass through the radial flange 26 at the bottom end of the bonnet 22 and are received in threaded bores in the top of the valve body. The bonnet 22 closes off the top of the valve chamber 11 and typically accommodates a valve stem packing (not shown).

The valve stem connection to the gate member 16 is by means of a drive nut 29 which is threaded onto the lower end portion of the valve stem and held within a slot 30 formed in the top end portion of the gate member 16 and extending laterally therethrough. The threaded lower end portion of the valve stem 21 is received in a blind bore 33 which extends in the longitudinal axial direction of the gate member 16 from the top and thereof and through the transverse slot 30. The diameter of the bore 33 is slightly larger than that of the valve stem 21, thus allowing for a limited floating movement of the gate member 16 in the direction of the flow passages through the valve and also providing a generally low stress stem-gate connection. A stem-gate connection of this type is shown in U.S. Pat. No. 3,223,380 to Hochmuth et al.

The operation of a non-rising type of valve as shown in FIG. 1 is well known, it being understood that turning of the handwheel 23 results in longitudinal axial movement of the gate member 16 in the direction transverse to the flow passages, the gate member 16 being prevented from turning. In the uppermost position of the gate member 16, ears 29a on the drive nut 29 engage a downward facing annular shoulder 31 in the bore of the bonnet 22 which serves as a stop to the upward movement of the gate member 16. In this uppermost position of the gate member 16, a port 34 through the gate member 16 is disposed in registry with the flow passages 12, 13 and the valve is open. In the lowermost position of the gate member 16, wherein the ears 29a engage the upward facing shoulder 32 in the valve chamber 11, the gate member 16 closes off the flow passages 12 and 13.

For sealing purposes, the gate member 16 is provided with parallel planar sealing faces on the sides thereof which face the flow passages 12, 13 and extend substantially perpendicularly thereto. As is well known the parallel sealing faces of the gate member 16 cooperate with and sealingly engage annular seat members 40 and 41 in the annular seat pockets 37, 36 which surround the flow passages 12 and 13, respectively, directly adjacent the valve chamber 11 and opening thereto. The sealing relationship of the gate member 16 with each seat member 40 and 41 is conventionally provided by a sealing ring of deformable plastic or other resilient material which is carried in the seat member in the face thereof which is directly adjacent the parallel sealing face of the gate member.

Figure 4:
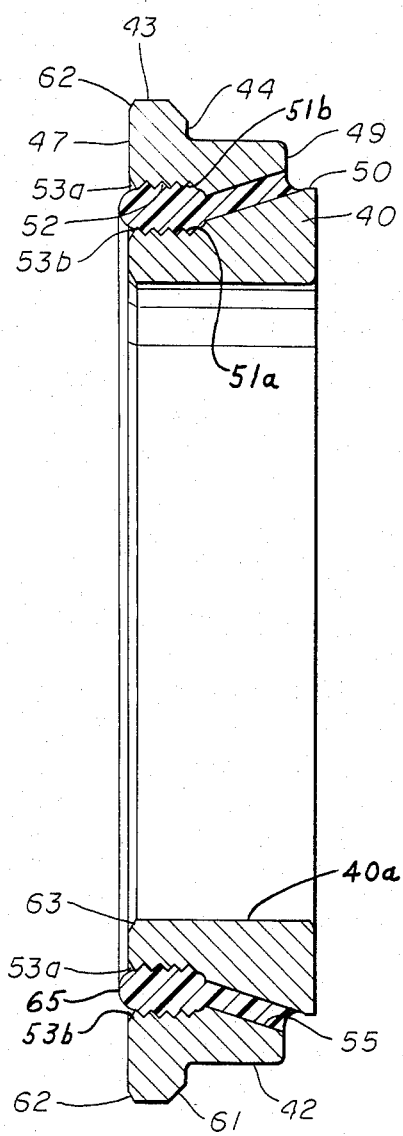
FIG. 4 is an enlarged sectional view through the seat ring of this invention.
Figure 5:
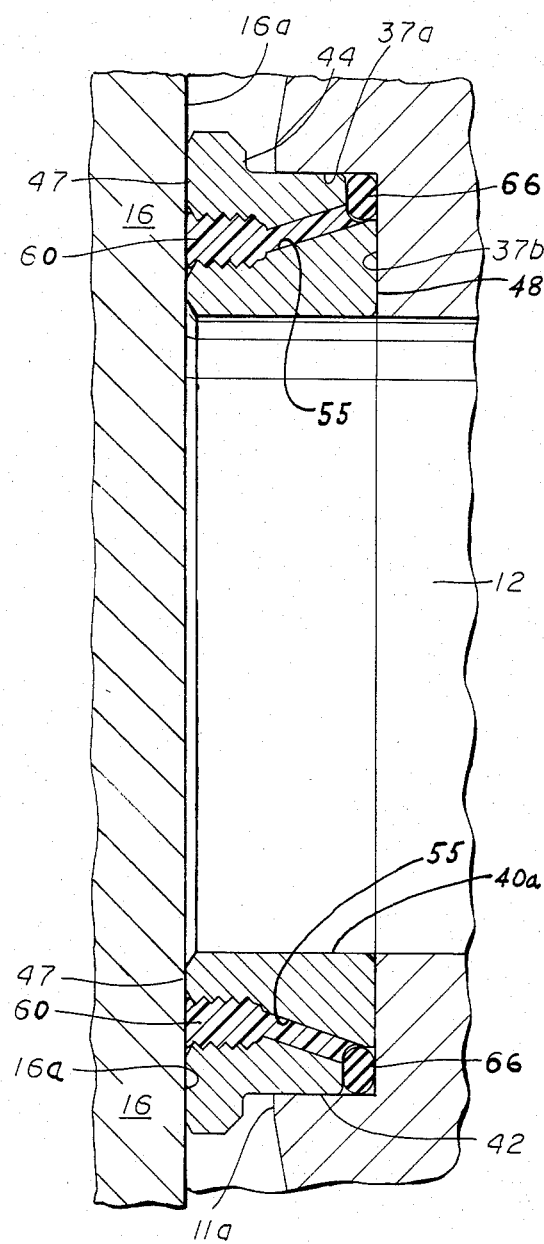
FIG. 5 is an enlarged fragmentary sectional view of the valve of FIG. 1 showing the valve seat assembly of this invention in sealing relationship with the gate element of the valve.

The seat ring 40 in the valve seat assembly of this invention is shown in detail in FIGS. 2 through 5. Although the seat ring 40 is the upstream seat member in the valve of FIG. 1, it is to be understood that the downstream seat member 41 is identical thereto. The seat member 40 is a ring of metallic material which is provided with a bore 40a therethrough of substantially identical diameter and configuration to that of the flow passage 12. The ring 40 is provided with an annular rear face 48 which lies in a plane extending radially with respect to the axis of the ring. The rear face 48 of the seat ring 40 is disposed in flush engagement with the bottom wall 37b of the seat pocket 37 when the seat member 40 is disposed therein as shown in FIGS. 1 and 5. The seat ring 40 is also provided with a coaxial cylindrical outer wall 42 with a diameter which is very slightly smaller than the diameter of the cylindrical wall 37a of the seat pocket 37 so that the seat member 40 will fit snugly within the seat pocket 37.

The seat ring 40 is also provided with an annular planar front face 47 which also resides in a plane extending radially with respect to the ring axis. It is also provided with an external radial flange 43 adjacent its front face for purposes to be hereinafter described. As shown in FIG. 5, the axial dimension of the seat ring 40 exceeds the depth of the seat pocket 37 which corresponds to the axial dimension of the cylindrical wall 37a of the seat pocket. Also, the thickness of the flange 43 as measured in the axial direction of the ring is such that the rear wall 44 of the flange 43 does not engage the valve chamber wall 11a when the seat ring 40 is fully seated in the seat pocket 37 as shown in FIG. 5.

The seat ring 40 is also formed with an annular notch in the axial outer corner of the ring as defined by a cylindrical surface 50 which extends from its rear face 48 in a coaxial direction of the ring 40 and the annular planar surface 49 which faces towards the bottom of the seat pocket and intersects the cylindrical surface 50.

In its front face the seat ring 40 is provided with an annular groove 51 coaxial with the ring axis and provided with side walls 51a, 51b which are formed with a plurality of annular projections or serrations. The opening of the groove 51 in the front face of the ring is also widened by provision of the bevelled surfaces 53a, 53b to define the annular front edges of the groove. It is also to be noted that the diameter of the inner groove wall 51a is less than that of the cylindrical surface 50 of the corner notch at the rear of the seat ring 40.

The seat ring 40 is also provided with a plurality of linear passages 55 which extend from the bottom of the groove 51 in the front face of the seat ring to the corner notch at the rear of the seat ring. In the embodiment of the invention illustrated herein, there are 14 such passages provided in the seat ring 40 in an equiangular spacing arrangement. For the purposes of the invention the number of such passages will vary in accordance with the size of the ring with rings of larger diameter having the greater number of passages. For most applications, the number is selected to provide for an equiangular spacing in the range of 20° to 30°.

As shown in FIGS. 4 and 5, the passages 55 are filled with an elastomer material 60 which is molded therein to fill the passages 55 and also the groove 51 in the front face of the seat ring. Preliminary to the molding process, however, all the metal surfaces of the seat ring 40 which are to contact the elastomer material are coated with an elastomer adhesive. Thus, when the elastomer material is molded in place, it is also bonded securely to the walls of the passages 55 and the annular groove 51. The front face 65 of the elastomer material 60 is a rounded projection, as best seen in FIG. 4, which projects approximately 0.022 inches in an axial direction beyond the plane of the face 47 of the seat ring for sealing purposes.

The particular elastomer material selected for the seat ring 40 is determined by the intended use of the valve in which it is employed. If the valve seat is to function in a sandy slurry media or other abrasive or corrosive ladings, an epichlorohydrin elastomer should be used. In addition to being very abrasion resistant, epichlorohydrin material has the desirable characteristics that it doesn't stiffen dramatically at low temperatures, and doesn't harden or polymerize in the presence of hydrogen sulfide.

In FIG. 5, the seat assembly of the invention is shown installed in the seat pocket 37 of the valve of FIG. 1 in the condition of sealing off the flow way through the valve when the gate member 16 is in position for closing the flow passages 12, 13. The complete seat assembly includes an O-ring 66 of epichlorohydrin material. The inner diamater of the O-ring is such that it fits snugly around the cylindrical surface 50 of the corner notch in the rear of the seat ring 40. When the gate member 16 is disposed against the seat ring assembly with its planar sealing surface 16 flush against the elastomer insert 60, the sealing ring 40 is seated snugly in the seat pocket 37 and compresses the O-ring 66 which establishes fluid-tight seals with the bottom 37b of the seat pocket as well as the cylindrical wall 37a of the seat pocket. It also seals against the annular wall 49 of the corner notch in the seat ring 40.

On the upstream side of the gate member 16, pressurized fluid from the inlet passage 12 enters between the rear face 48 of the seat ring and the bottom 37b of the seat pocket as far as the O-ring 66 where it is effectively blocked. At the front face of the seat ring, pressurized fluid from the inlet passage 12 enters between the front face 47 of the seat ring and the planar sealing face 16a of the gate member 16 as far as the annular area of contact between the elastomer insert 60 and the gate member 16. It is therefore to be noted that when the valve is first closed and pressurized fluid then introduced into the inlet passage 12, the seat ring 40 is pressure energized in the direction towards the gate 16 since the annular area which is exposed to flowline pressure at the back of the seat ring is greater than the annular area which is exposed to flowline pressure at the front face of the seat ring.

It is also to be noted that the passages 55 open into the corner notch at the intersection of the two notch defining surfaces 49 and 50. This insures that pressurized fluid from the flowline 12 will also act on the elastomer material at the ends of the passages 55 adjacent the O-ring 66. Accordingly, the elastomer insert in the passages 55 and the face groove 51 is also pressure energized in the direction of the gate 16 to effect a better seal therewith. Since the elastomer is bonded by an elastomer adhesive to the walls of the passages 55 and the groove 51, it will not be extruded therefrom. This pressure energization of the elastomer insert towards the gate 16 occurs even though the valve chamber 11 may have become pressurized as might occur during the repeated opening and closing of the valve, and particularly so with an expandable gate valve.

When the seat assembly of the invention is employed as a downstream seat member, sealing is accomplished principally by the check valve action of the flowline pressure against the gate member which forces the gate into intimate contact with the downstream seat member and forces the downstream seat member tightly against the back of the seat pocket. As is true with the upstream seat member, the elastomer sealing element provides an effective seal, although due principally to the mechanical compression of the elastomer, and its abrasion resistance is similarly enhanced by the relief areas provided by the widened opening of the groove in the face of the seat ring.

A significant feature of the invention is provided by the bevelled surfaces 53a and 53b at the mouth of the groove 51. As shown in FIG. 5, the rounded projection 65 at the front face of the seat ring is flattened and compressed by its contact with the gate member 16. The compressed and deformed elastomer material is accommodated in the valleys or relief areas provided by the bevelled surfaces 53a and 53b and is therefore much less subject to being abraded by constant and repeated contact with the gate member 16 as are conventional sealing elements.

It is also to be noted that the axial dimension of the seat ring 40 is such as to provide for very little clearance between the slab gate member 16 and the face 47 of the seat ring. This, of course, assists the sealing capability of the seat ring. With conventional seat rings for slab gate valves, it would also be an important cause of the rapid erosion of the sealing element in the face of the seat ring. It will also be seen that the flange 43 at the front of the seat ring 40 has bevelled edges 61 and 62 on its rear and front surfaces, respectively. The bevelled edge 62 facilitates the passage of the gate member 16 and the annular edge of its transverse port 34 across the face of the seat ring. The bevelled surface 61 engages a tang (not shown) at the bottom of the part in the gate guide 42 in which the seat ring 40 is mounted and tends to maintain the perpendicular relationship of the gate guide to the axis of the seat ring.

It is to be understood that the foregoing description of a preferred embodiment of the invention has been presented for purposes of illustration and description and is not intended to limit the invention to the precise form disclosed. For example, almost any known elastomer could be used in lieu of epichlorohydrin if there is no particular concern with abrasion. Ethylene propylene is particularly suited for use in steam conduits and accordingly, in geothermal well applications. Fluoroelastomers such as Viton or Teflon, of course, which have little abrasion resistance should not be used where abrasion is of serious concern. Other changes could also be made in the angle at which the passageways are disposed relative to the axis of the ring so long as they communicate the face groove of the ring with its O-ring notch and the number of such passageways could also be varied to some extent so long as proper sealing can be obtained. It is to be appreciated therefore, that changes may be made by those skilled in the art to suit particular applications of the invention without departing from the spirit of the invention.

While the seat ring of this invention has herein been illustrated with respect to a non-rising stem type of slab gate valve, it could be used as well as a seat for expanding gate valves and valves of the rising stem variety. It is important, however, that the seat ring be pressure energizable in the direction towards the gate and it is therefore primarily intended for use with valves having "floating" seat rings. It could, however, be used with valves having fixed seats wherein fluid pressure from the flowline enters behind the rear face of the seat ring.

What is claimed is:

1. In a gate valve structure comprising a valve body with a valve chamber and inlet and outlet flow passages communicating with the valve chamber and defining a flow way through the valve body, a gate member mounted in the valve body for movement between open and closed positions relative to said flow passages, and a pair of internal annular recesses opening to the valve chamber with one of said recesses in concentric surrounding relation to the inlet flow passage and the other of said recesses in concentric surrounding relation to the outlet flow passage, each said recess being defined by an annular bottom end wall residing in a plane disposed substantially radially of the axis of the flow passage and a circumferential cylindrical side wall;

a valve seat assembly adapted to be fitted within either of said recesses, each valve seat assembly comprising a metallic seat ring having an annular rear face for abutting engagement with the bottom end wall of the recess in which it is disposed and an annular corner notch formed at the rear of the seat ring which opens to said rear face and the cylindrical side wall of the seat ring whereby an annular resilient sealing member may be disposed in said corner notch for sealing between the valve body and said seat ring;

said seat ring having an annular planar front face disposed towards the gate member and provided with an annular groove in coaxial relation to the ring axis and in surrounding relation to the flow way through the valve, said annular groove being provided with a plurality of serrations in the side walls thereof and having an inner diameter which is less than the inner diameter of said corner notch;

said metallic seat ring having a plurality of passages formed therein which are spaced in equiangular relation about the ring and extend from the annular groove in the front face of the seat ring to the corner notch at the rear of the seat ring, said passages and said annular groove being filled with a single mass of elastomer sealing element which is molded within the walls of said annular groove and said passages and adhesive bonded throughout the area extent of said groove and passages, said elastomer sealing element being formed at the front face of the seat ring to provide an annular projection with a rounded surface which projects slightly beyond the front face of the seat ring towards said gate member, said annular face groove of the seat ring having a widened opening at the face of the seat ring as defined by a pair of annular bevelled surfaces at the two sides of the annular groove whereby said elastomer sealing element is adapted to provide a fluid-tight seal with the gate member when said annular projection is compressed by the gate member in the open and closed conditions of the gate member and the deformed elastomer material provided by the compression of its annular face projection is accommodated by the widened opening of the annular face groove to thereby enhance its resistance to abrasion by the gate member.

2. In a gate valve structure as recited in claim 1 wherein said elastomer sealing element and said annular resilient sealing means are formed of epichlorohydrin material.

3. In a gate valve structure as recited in claim 1 wherein the number of said passages between the annular groove and said corner notch provides for an equiangular spacing therebetween in the range of 20° to 30°.

4. In a gate valve structure as recited in claim 1 wherein said elastomer sealing element is adhesive bonded to the walls of said annular groove and said passages.

* * * * *